May 7, 1968 V. H. REISSER 3,381,769

PROPORTIONAL DIFFERENTIAL MEANS

Filed Feb. 10, 1966 4 Sheets-Sheet 1

Fig. 1

INVENTOR
VERNON H. REISSER
BY Zach Zarly, McKee & Thomte
ATTORNEYS

Fig. 2

INVENTOR
VERNON H. REISSER
BY Zack, Zarley, McKee & Thoms
ATTORNEYS

Fig. 3

INVENTOR
VERNON H. REISSER
BY Dick, Zarley, McKee & Thomte
ATTORNEYS

United States Patent Office 3,381,769
Patented May 7, 1968

3,381,769
PROPORTIONAL DIFFERENTIAL MEANS
Vernon H. Reisser, 10617 Poppleton Ave.,
Omaha, Nebr. 68124
Filed Feb. 10, 1966, Ser. No. 526,489
12 Claims. (Cl. 180—22)

ABSTRACT OF THE DISCLOSURE

A proportional differential means with three driving axle shafts adapted to be used on construction vehicles such as pneumatic tire rollers, dozers push-tractors, loaders and off highway vehicles. The differential means is connected to a power source on the vehicle which includes a frame with left and right primary drive wheel means thereon. A third drive wheel means is also provided on the frame means and is located in a vertical plane substantially equidistant from each of the primary drive wheel means. The differential means has a gear means which includes separate gears independently connected to the primary drive wheels. A connecting power means connects the third drive wheel means to the gears whereby the speed of rotation of the third drive wheel means multiplied times its diameter will be one-half the summation of the respective rotational speeds of the primary drive wheel means multiplied by their respective diameters.

---

Present four-wheel drive two-differential rubber tire dozers, push-tractors and loaders are limited many times in job application because they lack the traction and flotation of crawler tractors. However, the above named construction vehicles are rapidly replacing crawler tractors in many job applications because they are faster, more mobile, and less expensive to maintain than the crawler tractors. The proportional differential means described herein is designed to increase the traction and flotation of the various construction vehicles. These construction vehicles generally incorporate a standard differential with two driving axles and wheels. The standard differential with two driving axles and wheels adequately powers or drives the construction vehicles if ideal traction conditions exist. However, when ideal traction conditions do not exist, the standard differential with two driving axles and wheels is unsatisfactory due to the tendency of one of the driving axles and wheel to lose its traction which results in less than efficient operation. When one of the driving wheels loses its traction, the wheel will spin rapidly while the other driving wheel will have its rate of rotation slowed which results in less than efficient operation. The proportional differential of this invention has three driving axles and wheels, instead of the standard differential with two driving axles and wheels, to increase tractive effort approximately fifty percent, assuming tire sizes and the weight on each tire remains the same. Thus, the standard four-wheel drive two-differential, pneumatic tired tractor-dozer would become a five-wheel drive tractor-drozer if a proportional differential means with three driving wheels were positioned in the front of the vehicle and a standard differential with two driving wheels were positioned at the rear of the vehicle, thus increasing traction and flotation twenty-five percent. Also, if a six-wheel drive tractor-dozer with two proportional differentials of this invention replace two standard differentials, with three drive axles and wheels, both front and rear, the traction and flotation thereof would be increased approximately fifty percent.

Therefore, it is a principal object of this invention to provide a proportional differential means with three driving axle shafts.

A further object of this invention is to provide a proportional differential means which increases the traction and flotation of vehicles.

A further object of this invention is to provide a proportional differential means which provides positive division of rotation to each of the three driving axles so that each of the three driving wheels will automatically proportion positive rotation to the radius of a power turn.

A further object of this invention is to provide a proportional differential means having three driving axles which provides a means of transferring torque and rotation from any one or two driving axles which do not have traction, to two or one driving axle with traction.

A further object of this invention is to provide a means of transferring torque from any one or two driving wheels which do not have full traction, to two or one driving wheels with traction, by means of applying brakes to either one of the two outer driving wheels.

A further object of this invention is to provide a proportional differential which is structurally sound and easily serviced.

A further object of this invention is to provide a proportional differential means which is adaptable for the use on a pneumatic tire roller which permits the roller to be extremely wide in construction without causing equipment failure on the roller.

A further object of this invention is to provide a proportional differential means adapted for use on a pneumatic tire roller which permits the roller to smoothly compact the road bed.

A further object of this invention is to provide a proportional differential means which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

Figure 1:
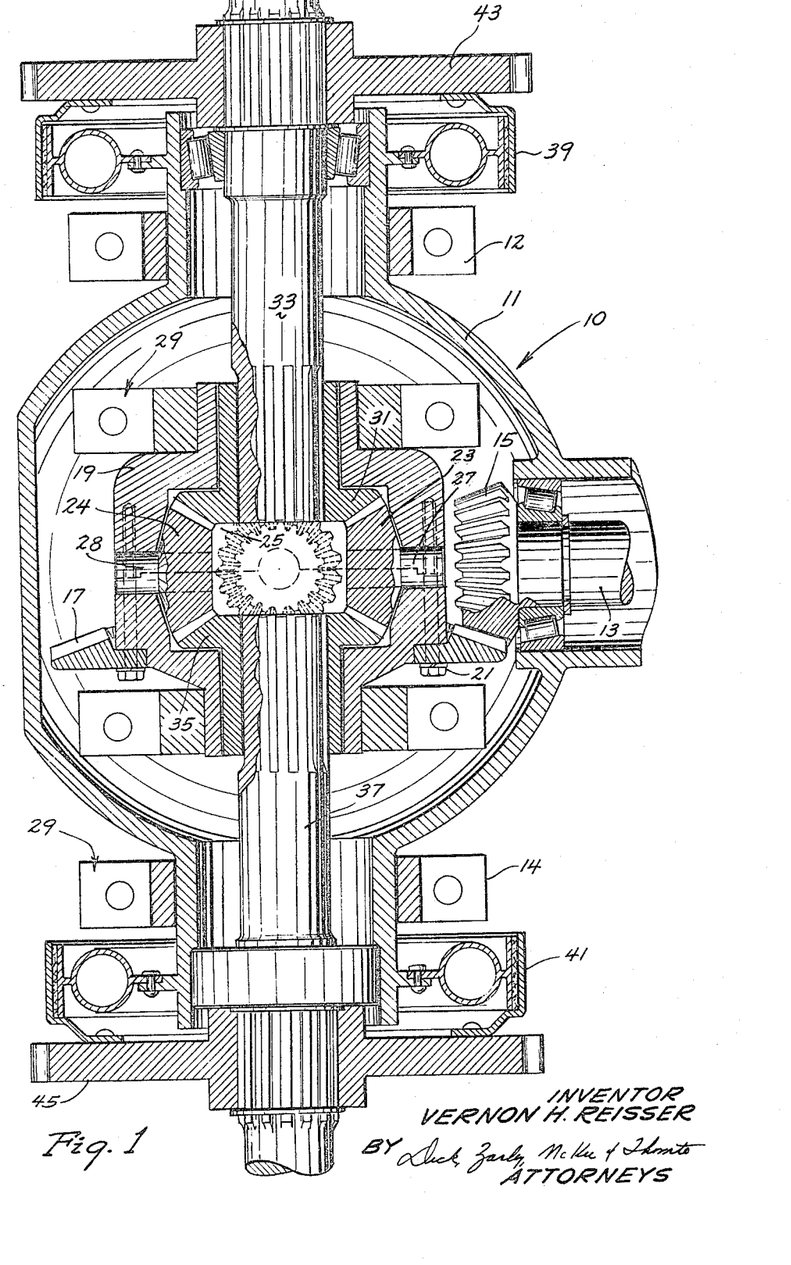
FIG. 1 is a fragmentary top view of a standard differential to which proportional differential means of this invention would be operatively connected, with portions thereof cut away to more fully illustrate the invention.

The numeral 10 generally designates a conventional differential means in FIG. 1 includig a differential housing 11 which is supported at opposite sides thereof by differential carrier brackets 12 and 14. A power shaft 13 rotatably extends into housing 11 and is driven by a power means (not shown). A pinion gear 15 is mounted on the inner end of shaft 13 and operatively engages a ring gear 17 which is secured to a differential case 19 by bolts 21. Differential case 19 houses spider gears 23 and 24 and cross assembly 25. Spider gears 23 and 24 are rotatably mounted on spider shafts 27 and 28, the outer ends of which are received by differential case 19. Differential means has been described as having only two spider gears and two spider shafts for purposes of clarity, however, differential means 10 would normally be provided with four spider gears and four spider shafts.

The numeral 29 generally designates a split carrier differential housing which embraces differential case 19 as illustrated in FIG. 1. A left drive gear 31 engages the left sides of spider gears 23 and 24 and is keyed to a left drive shaft 33 which rotatably extends horizontally outwardly from the left side of split carrier differential housing 29 and differential housing 11. A right drive gear 35 engages the right sides of spider gears 23 and 24 and is keyed to a right drive shaft 37 which rotatably extends horizontally outwardly from the right side of split carrier differential housing 29 and differential housing 11.

A left brake assembly 39 is operatively mounted on the left end of housing 11 and is operatively connected to left transfer sprocket 43 and is adapted to stop or slow the rotation of left transfer sprocket 43 and left drive shaft 33 in conventional fashion. A right brake assembly 41 is operatively mounted on the right end of housing 11 and is operatively connected to right transfer sprocket 45 and is adapted to stop or slow the rotation of right transfer sprocket 45 and right drive shaft 37 in conventional fashion. For purposes of the various right and left nomenclature being used in the description of FIG. 1, the upper portion of FIG. 1 will be considered the left side of the differential means and the lower portion of FIG. 1 will be considered the right side of the differential means, or in other words, as would be viewed from the left.

Left transfer sprocket 43 and right transfer sprocket 45 are keyed to left drive shaft 33 and right drive shaft 37 respectively outwardly of brake assemblies 39 and 41 respectively and are of equal pitch diameter. The outer ends of left drive shaft 33 and right drive shaft 37 are operatively connected to left and right drive wheels respectively.

Figure 2:
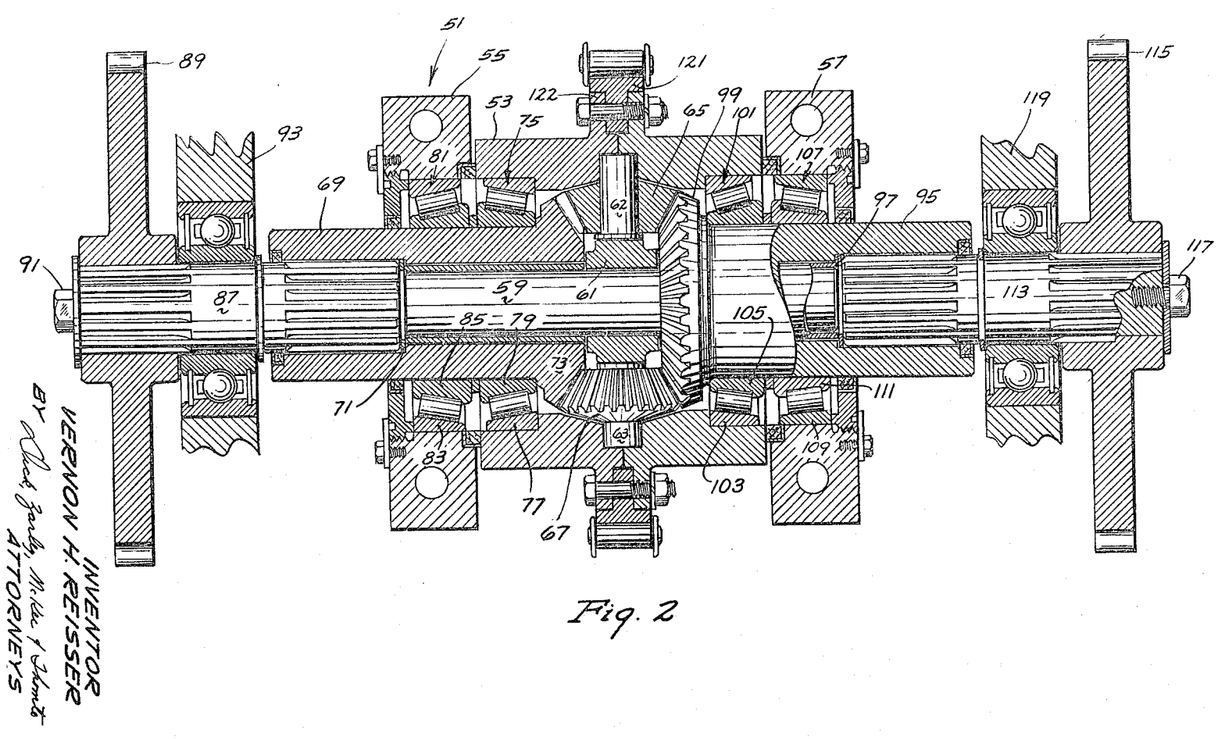
FIG. 2 is a fragmentary top view of the proportional differential means with portions thereof cut away to more fully illustrate the invention.

The numeral 51 generally designates a proportional differential means seen in FIG. 2. Proportional differential means is supported by proportional differential carrier brackets 55 and 57 adjacent opposite sides thereof. A center idler shaft 59 extends through proportional differential case 53 and has a proportional shaft housing 61 freely rotatably mounted thereon at the center of its length. Proportional shaft housing 61 is doweled at opposite ends thereof and receives one end of spider shafts 62 and 63 therein. The other ends of spider shafts 62 and 63 are received by proportional differential case 53 as illustrated in FIG. 2. A proportional spider gear 65 rotatably embraces spider shaft 62 between proportional differential case 53 and proportional shaft housing 61 and a proportional spider gear 67 rotatably embraces spider shaft 63 between proportional differential case 53 and proportional shaft housing 61. For purposes of clarity, proportional differential means 51 has been illustrated as having only two spider shafts and two spider gears, however, proportional differential means would normally be provided with four spider shafts and four spider gears.

A left proportional gear housing 69 is rotatably mounted on the left end of center idler shaft 59 and extends therefrom as seen in FIG. 2. A snap ring 71 or other suitable means is mounted in left proportional gear housing 69 to limit movement of center idler shaft 59 to the left as viewed in FIG. 2. A left proportional drive gear 73 is a part of the inner end of left proportional gear housing 69 and is in engagement with proportional spider gears 65 and 67. A bearing means 75 consisting of a bearing cup 77 and a bearing cone 79 is operatively positioned between the left end of proportional differential case 53 and the inner end of left proportional gear housing 69. A bearing means 81 consisting of a bearing cup 83 and a bearing cone 85 is positioned between left proportional gear housing 69 and proportional differential carrier bracket 55. The outer end of left proportional gear housing 69 is internally splined and receives a left proportional drive shaft 87 which is keyed thereinto. A left power sprocket 89 is splined onto the outer end of left proportional drive shaft 87 and is maintained thereon by bolt 91. A left intermediate sprocket support 93 rotatably embraces left proportional drive shaft 87 between left power sprocket 89 and the outer end of left proportional gear housing 69.

A right proportional gear housing 95 is rotatably mounted on the right end of center idler shaft 59 and extends therefrom as seen in FIG. 2. A snap ring 97 is mounted in right proportional gear housing 95 to limit movement of center idler shaft 59 to the right as viewed in FIG. 2. A right proportional drive gear 99 is a part of the inner end of right proportional gear housing 95 which is in engagement with proportional spider gears 65 and 67. A bearing means 101 consisting of a bearing cup 103 and a bearing cone 105 is operatively positioned between the right end of proportional differential case 53 and the inner end of right proportional gear housing 95. A bearing means 107 consisting of a bearing cup 109 and a bearing cone 111 is positioned between right proportional gear housing 95 and proportional differential carrier bracket 57.

The outer end of right proportional gear housing 95 is internally splined and receives a right proportional drive shaft 113 which is keyed thereinto. A right power sprocket 115 is splined onto the outer end of right proportional drive shaft 113 and is maintained thereon by bolt 117. A right intermediate sprocket support 119 rotatably embraces right proportional drive shaft 113 between right power sprocket 115 and the outer end of right proportional gear housing 95. A center drive external sprocket 121 is secured to flange 122 which extends radially outwardly from proportional differential case 53 by any convenient means such as by bolts or the like.

The differential means 10 of FIG. 1 and the proportional differential means 51 of FIG. 2 would be operatively connected by means of a chain (not shown) extending around and between left transfer sprocket 43 of differential means 10 and left power sprocket 89 of proportional differential means 51 and by a chain (not shown) extending around and between right transfer sprocket 45 of differential means 10 and right power sprocket 115 of proportional differential means 51. Center drive external sprocket 121 would be connected to a center drive wheel assembly by a suitable chain means.

Left transfer sprocket 43, right transfer sprocket 45, left power sprocket 89, right power sprocket 115, and center drive external sprocket 121 are of equal pitch diameter in this description. Additionally, left transfer sprocket 43 and left power sprocket 89 are aligned in the same plane. Likewise, right transfer sprocket 45 and right power sprocket 115 are also aligned in the same plane. It is preferred but not necessary that the center lines of spider shafts 27, 28 and spider shafts 62, 63 are aligned and that the distance between the center line of spider shafts 27, 28 and the center face of left transfer sprocket 43 is: (1) equal to the distance between the center line of spider shafts 27, 28 and the center face of right transfer sprocket 45; (2) equal to the distance between the center line of spider shafts 62, 63 and the center face of left power sprocket 89; and (3) equal to the distance between the center line of spider shafts 62, 63 and the center face of right power sprocket 115. Spider gears 23 and 24 and proportional spider gears 65 and 67 will match the pitch diameters of their respective drive gears 31 and 35, and 73 and 99. Left drive gear 31 must match right drive gear 35, and left proportional drive gear 73 must match right proportional drive gear 99, but gears 31 and 35 do not necessarily need to match gears 73 and 99. The pitch diameters of the various sprockets and gears described above may be changed so as not to be equal as described as long as the ratios therebetween remain such that the drive wheels of equal circumference which are operatively connected to left drive shaft 33, right drive shaft 37, and center drive external sprocket 121 will be rotated at the same speed when the vehicle is travelling in a straight line.

When the center drive wheel or wheels are larger or smaller in diameter than the equal diameters of the left and right drive wheel or wheels, the pitch diameters of the various sprockets and gears described above may be changed so as not to be equal. However, in such case, the ratios therebetween must be such that the diameter of the left drive wheel or wheels multiplied times the speed of rotation of the left drive shaft 33 equals the diameter of the right drive wheel or wheels multiplied by the speed of rotation of the right drive shaft when the vehicle is traveling in a straight line. At the same time, these products must equal the product resulting from the diameter of the center drive wheel or wheels multiplied times the speed of rotation of the external drive sprocket 121.

Figure 3:
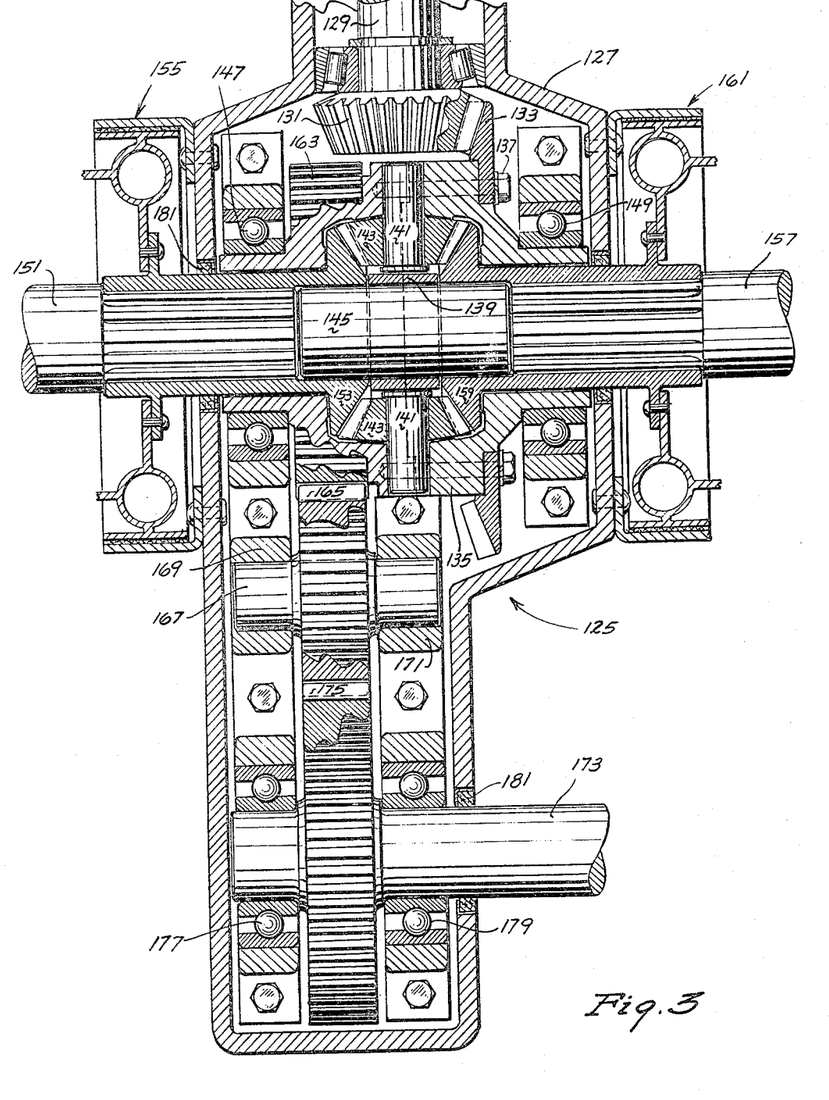
FIG. 3 is a fragmentary top view of a modified version of the proportional differential means with portions thereof cut away to more fully illustrate the invention.

As stated before, the differential means 10 of FIG. 1 and the proportional differential means 51 of FIG. 2 are operatively connected together and when connected together, form a three-drive axle proportional differential which will be referred to by the reference numeral 123. A simplified modification of the three-drive axle proportional differential is illustrated in FIG. 3 and is referred to by the reference numeral 125.

The numeral 127 generally designates a differential housing having a power shaft 129 rotatably extending into one end thereof and which would be driven by a power means (not shown). A pinion gear 131 is mounted on the inner end of shaft 129 and operatively engages a ring gear 133 which is secured to a differential case 135 by means of bolts 137. Differential case 135 houses a cross assembly 139 with a plurality of spider shafts 141 operatively mounted therein, and extending therefrom, the ends of which are received by differential case 135 as illustrated in FIG. 3. A spider gear 143 is rotatably mounted on each of spider shafts 141 as illustrated in FIG. 3. Differential case 135 is rotatably supported in housing 127 by means of bearings 147 and 149 at the opposite sides thereof. A center idler shaft 145 freely rotatably extends through cross member 139 and has opposite ends protruding therefrom. If desired, shafts 141 can be doweled into shaft 145 or can be an integral part of shaft 145 or free to rotate about shaft 145 as shown in FIG. 2.

A left drive shaft 151 rotatably extends into the left side of housing 127 and differential case 135 and has a left drive gear 153 keyed onto the inner end thereof which is in engagement with spider gears 143. The inner end of left drive gear 153 is internally recessed to rotatably receive one end of center idler shaft 145. A left brake means 155 is operatively secured to the left side of housing 127 and operatively secured to left drive gear 153 and is adapted to reduce or stop the rotation of left drive shaft 151 and left drive gear 153 in conventional fashion. A right drive shaft 157 rotatably extends into the right side of housing 127 and differential case 135 and has a right drive gear 159 keyed onto the inner end thereof which is in engagement with spider gears 143. The inner end of right drive gear 159 is internally recessed to rotatably receive the other end of center idler shaft 145. Center idler shaft 145 provides alignment and strength to the structure but may be omitted if found not necessary. A right brake means 161 is operatively connected to the right side of housing 127 and operatively secured to right drive gear 159 and is adapted to slow or stop the rotation of right drive shaft 157 and right drive gear 159 in conventional fashion.

The numeral 163 designates a differential gear which is operatively connected to the left side of differential case 135 by any convenient means for rotation therewith. If desired, differential gear 163 could be made an integral part of ring gear 133 by slight modification thereof. An idler gear 165 is rotatably mounted on a shaft 167 in housing 127 and is supported by bearing means 169 and 171 at opposite sides thereof. Idler gear 165 is in engagement with differential gear 163 as illustrated in FIG. 3 The numeral 173 designates a center drive shaft which rotatably extends through housing 127. A power gear 175 is splined onto center drive shaft 173 and is in engagement with idler gear 165. Center drive shaft 173 is rotatably supported in housing 127 by means of bearings 177 and 179 at opposite sides of power gear 175. Preferably power gear 175 is of equal pitch diameter with respect to drive gear 163, however, this is not necessary as long as the before discussed ratios are maintained. Idler gear 165 is merely intended to supply the proper rotational direction to power gear 175 and can be omitted if other means are provided between shaft 173 and the center drive wheel means to supply the proper rotational direction thereto. Housing 127 is provided with a plurality of oil seals generally referred to by the reference number 181 which prevents oil from escaping from the interior of housing 127.

Figure 4:
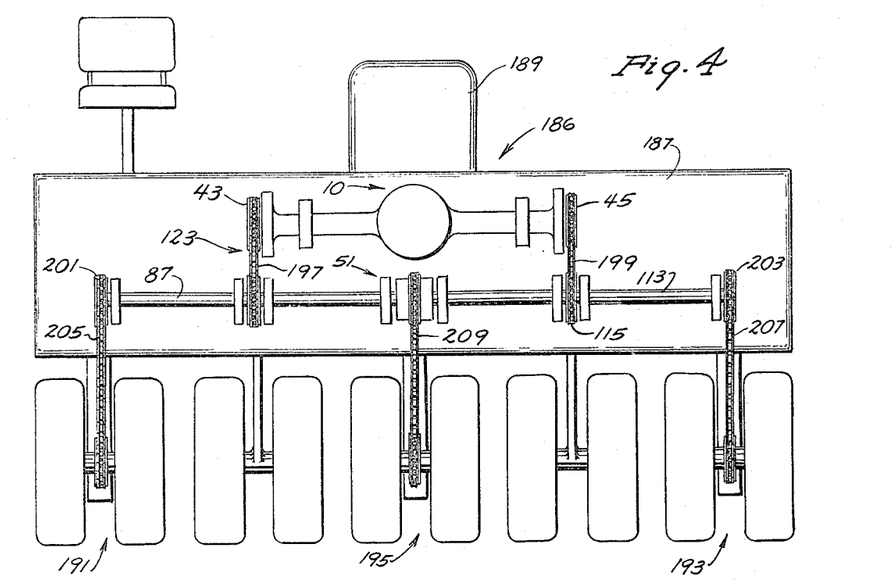
FIG. 4 is a rear view of the drive train of a pneumatic tire roller utilizing a standard differential and a proportional differential means.

With respect to FIG. 4, the numeral 186 generally designates a penumatic tired roller of the 19-wheel type. The three axle drive proportional differential means disclosed herein is ideally suited for such an environment. In FIG. 4 roller 186 is shown to include a frame 187, power source 189, left primary drive wheel means 191, right primary drive wheel means 193 and center drive wheel means 195.

A chain 197 connects left tranfser sprocket 43 and left power sprocket 89 and a chain 199 connects right transfer sprocket 45 and right power sprocket 115.

The differential means 10 and proportional differential means 51 need only to be slightly modified in order to be used on the environment illustrated in FIG. 4. In the environment of FIG. 4, left drive shaft 33 terminates adjacent left transfer sprocket 43 and right drive shaft 37 terminates adjacent right transfer sprocket 45. It can also be seen in FIG. 4 that left proportional drive shaft 87 etxends outwardly of left power sprocket 89 and has a sprocket 201 mounted on the outer end thereof. Left proportional drive shaft 87 also extends inwardly towards proportional differential means 51 to drive left proportional drive gear 73 (FIG. 2). Likewise, right proportional drive shaft 113 extends outwardly of right power sprocket 115 and has a sprocket 203 mounted on the outer end thereof. Right proportional drive shaft 113 also extends inwardly towards proportional differential means 51 to drive right differential drive gear 99 (FIG. 2). A chain 205 operatively connects sprocket 201 and left primary drive wheel means 191 and a chain 207 operatively connects sprocket 203 and right primary drive wheel means 193. A chain 209 operatively connects center drive external sprocket 121 and center drive wheel means 195 (FIG. 4).

Figure 5:
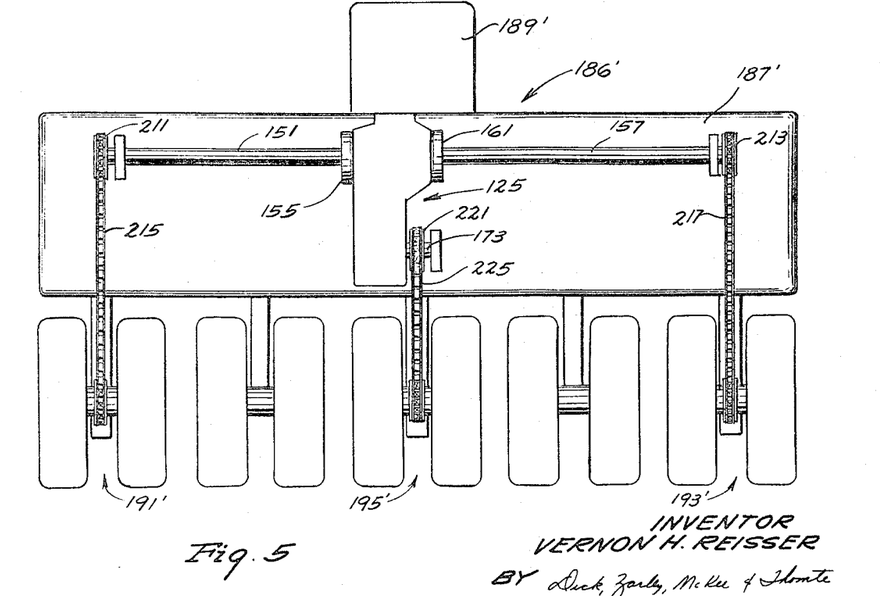
FIG. 5 is a rear view of the drive train of a pneumatic tire roller utilizing a modified proportional differential means.

With respect to FIG. 5, the numeral 186' generally designates a pneumatic tired roller of the 19-wheel type. As seen in FIG. 5, the modification of FIG. 3 has been incorporated therein. Roller 186' includes a frame 187', a power source 189', left primary drive wheel means 191', right primary drive wheel means 193' and center drive wheel means 195'. A sprocket 211 is mounted on the outer end of left drive shaft 151 and a sprocket 213 is mounted on the outer end of right drive shaft 157. A chain 215 operatively connects sprocket 211 and left primary drive wheel means 191' and a chain 217 operatively connects sprocket 213 and right primary drive wheel means 193'. A sprocket 221 is mounted on one end of center drive shaft 173 and is operatively connected to center drive wheel means 195' by means of chain 225. If desired, a sprocket could be mounted on the other end of center drive shaft 173 which could be operatively connected to the center drive wheel means 195.

With respect to the embodiment of FIGS. 1 and 2, assuming that differential means 10 and proportional differential means 51 have been connected as previously described to form a three-drive axle proportional differential means 123, the normal method of operation is as follows: As previously stated, for purposes of clarity, left transfer sprocket 43, left power sprocket 89, right transfer sprocket 45, right power sprocket 115 and center drive external sprocket 121 have equal pitch diameters and left drive shaft 33 would be operatively connected to a left drive wheel means, right drive shaft 37 would be operatively connected to a right drive wheel means and center drive external sprocket 121 would be operatively connected to a center drive wheel means. The center drive wheel means is located in a vertical plane substantially equally distant from each of the right and left drive wheel means. The driving sprockets within the proportional differential means 123 can be of different pitch diameters as long as the left and right drive train components, from driving pinion to left and right drive wheel means, match the center drive train components from driving pinion to center drive wheel means. This matching will result in the maintaining of the same ratio and direction. The sprockets and gears disclosed herein have been shown to have equal pitch diameters in order to simplify the construction and to clarify the explanation thereof.

Due to the structure of proportional differential means 123, left drive shaft 33 and the left drive wheel means equals left proportional gear housing 69 in rotation and direction and right drive shaft 37 and the right drive wheel means equal right proportional gear housing 95 in rotation and direction. From the rotation and direction of left proportional gear housing 69 and right proportional gear housing 95, the differences of rotation and direction between left drive shaft 33, right drive shaft 37 and center drive external sprocket 121 is divided. To explain the division or proportioning of rotation and direction, the following examples are given:

*Example No. 1*

Assuming that in a three-drive wheel means in combination with a three-drive axle proportional differential means, all three wheel means have traction and are rotating clockwise at the same speed. When such is the case, the vehicle is travelling in a straight line. Left drive shaft 33 and right drive shaft 37 and their respective drive wheel means rotate clockwise at the same r.p.m. because the left drive train (left drive shaft 33, left transfer sprocket 43, left power sprocket 89, left proportional gear housing 69) is equal to the right drive train (right drive shaft 37, right transfer sprocket 45, right power sprocket 115 and right proportional gear housing 95), then left proportional gear housing 69 and right proportional gear housing 95 are also rotating clockwise, and at the same r.p.m. left proportional gear housing 69 and right proportional gear housing 95 are in mesh with proportional spider gears 65 and 67 which are free to rotate on spider shafts 62 and 63 respectively. As stated before, spider shafts 62 and 63 are doweled, or fixed, to proportional differential case 53 and proportional shaft housing 61 as shown in FIG. 2. Inasmuch as left proportional gear housing 69 and right proportional gear housing 95 are rotating in the same direction and at the same speed, the engaged teeth of proportional spider gears 65 and 67, left proportional drive gear 73 on left proportional gear housing 69, right proportional drive gear 99 on right proportional gear housing 95, function as if they were keyed or rigidly secured together. Therefore, proportional spider gears 65 and 67 are not rotating around spider shafts 62 and 63 respectively but the complete assembly (left proportional gear housing 69, left proportional drive gear 73, right proportional gear housing 95, right proportional drive gear 99, proportional spider gears 65 and 67, spider shafts 62 and 63, proportional differential case 53 and proportional shaft housing 61), are rotating as a single unit. Because center drive external sprocket 121 is rigidly secured to proportional differential case 53, center drive external sprocket 121 will be rotating at the same speed and in the same direction as left transfer sprocket 43, right transfer sprocket 45, left power sprocket 89, and right power sprocket 115. In the above example, the vehicle is travelling in a straight line and all of the wheel means are driving equally.

*Example No. 2*

Assuming a vehicle makes a right pivot turn, the construction of a standard differential would cause the right drive shaft and the right wheel means to stop completely and the left drive shaft and the left wheel means would rotate around the radius of the turn. Assuming that a vehicle with a proportional differential means makes a right pivot turn, from previous explanation, right drive shaft 37 equals right proportional gear housing 95 in rotation and direction and left drive shaft 33 equals left proportional gear housing 69 in rotation and direction, thus the right proportional gear housing 95 is not rotating or equals zero r.p.m. In the above example, left proportional gear housing 69 is rotating in the direction of the turn. Assuming that right proportional gear housing 95 and the right drive wheel means are rotating at zero r.p.m. and the left proportional drive gear 73 and left proportional gear housing 69 is rotating at four r.p.m. in a clockwise direction and are in mesh with proportional spider gear 65. Because the center line of spider shaft 62 divides equally the distance between left proportional gear housing 69 and right proportional gear housing 95, it also divides the combined rotation of right proportional gear housing 95 (zero r.p.m.) and left proportional gear housing 69 (four r.p.m.) in this example. Thus, spider shaft 62 will rotate clockwise at two r.p.m. Spider shaft 62 is doweled, or fixed, to proportional differential case 53 and rotates therewith in the same direction and at the same rate of rotation. Thus, the center drive external sprocket 121 and the center drive wheel means are rotating clockwise at two r.p.m., the left drive shaft 33 and the left drive wheel means is rotating clockwise at four r.p.m. and the right drive shaft 37 and the right drive wheel means are rotating in zero r.p.m.

Full traction of the left drive wheel means and the center drive wheel means are maintained as they both pivot around the right wheel means because the center wheel means is equidistant between the left and right driving wheel means. The following formula illustrates the above example.

r.p.m. of center drive external sprocket and center drive wheel means=$CD$=2 r.p.m.
r.p.m. of left drive shaft and left drive wheel means =$LDS$=4 r.p.m.
r.p.m. of right drive shaft and right drive wheel means =$RDS$=0 r.p.m.

$$CD = \frac{RDS + CDS}{2}$$

$$CD = \frac{0 \text{ r.p.m.} + 4 \text{ r.p.m.}}{2}$$

$$CD = 2 \text{ r.p.m.}$$

Thus it can be seen from the above formula that the rate of rotation of the center drive wheel means equals one-half the summation of the rates of rotation of the right drive shaft and the left drive shaft.

*Example No. 3*

Assuming that a vehicle with a proportional differential three-drive axle and wheel assembly makes a right turn and assuming further that the left drive shaft 33 and the left drive wheel means are rotating at six r.p.m. and the right drive shaft 37 and the right drive wheel means are rotating at four r.p.m. From previous explanation, the rate of rotation and direction of the right drive shaft 37 equals the rate of rotation and direction of the right proportional gear housing 95, and the rate of rotation and direction of the left drive shaft 33 equals the rate of rotation and direction of the left proportional gear housing 69. Thus, the left proportional gear housing 69 is rotating at six r.p.m. and the right proportional gear housing 95 is rotating at four r.p.m. The right proportional gear housing 95, which is rotating at four r.p.m., and the left proportional gear housing 69, which is rotating at six r.p.m., are in mesh with proportional spider gear 65. Because the center line of spider shaft 62 divides the distance equally between right proportional gear housing 95 and left proportional gear housing 69, it also divides the combined rotation of right proportional gear housing 95 (four r.p.m.) and left proportional gear housing 69 (six r.p.m.). Thus the center line and spider shaft 62 will rotate at five r.p.m. (four r.p.m. plus six r.p.m. divided by two). Due to the connection of spider shaft 62 with proportional differential case 53 and the connection between proportional differential case 53 and center drive external sprocket 121, the center drive wheel means will rotate at five r.p.m. The above rate of rotation of the center drive wheel means is computed by the following formula.

r.p.m. of right drive shaft and wheel means=RDS=4 r.p.m.
r.p.m. of left drive shaft and wheel means=LDS=6 r.p.m.
r.p.m. of center drive external sprocket and wheel means=CD=5 r.p.m.

$$CD = \frac{RDS + LDS}{2}$$

$$CD = \frac{4 \text{ r.p.m.} + 6 \text{ r.p.m.}}{2}$$

$$CD = 5 \text{ r.p.m.}$$

Also, ring gear 17 and differential case 19=5 r.p.m.

The proportional differential means 123 in this example has provided for a positive division of rotation and torque to all three driving wheel means automatically to the radius of a power turn. An extreme example of the proportional differential three-drive axle and wheel assembly would be if the right drive shaft and right wheel means were rotating at plus ten r.p.m. clockwise, and the left drive shaft and left drive wheel means are rotating at a minus four r.p.m. counter-clockwise. The rate of rotation of the center drive external sprocket 121 and the center drive wheel means is computed to be three r.p.m. by the following formula.

$$CD = \frac{RDS + LDS}{2}$$

$$CD = \frac{+10 \text{ r.p.m.} + -4 \text{ r.p.m.}}{2}$$

$$CD = +3 \text{ r.p.m.}$$

The above is an example of a vehicle on a high center. The forces lifting the center drive wheel means are greater than the tractive force of the two outer driving wheel means.

Another important feature of this invention is to be able to provide a means of transferring torque from any one or two driving wheel means which do not have full traction, to one or two driving wheels having traction, by means of applying brakes to either of the one or two outer driving wheels. In Example #3 above, the center drive wheel means has a positive rotation of three r.p.m. and has substantially all of the traction available to the vehicle. The left drive wheel means, with little or no traction, rotated at a minus four r.p.m. (counter-clockwise) and the right drive wheel means with little or no traction rotated clockwise at plus ten r.p.m. By applying brake means 39 on left drive shaft 33, left drive shaft 33 and the left drive wheel means slows to a stop, then changes to a positive direction of rotation. This right drive shaft 37 and the right drive wheel means slows proportionately until left drive shaft 33, center drive external sprocket 121 and right drive shaft 37 and their respective drive wheels are rotating at plus three r.p.m. Each of the three drive wheels are rotating at the forward speed of the vehicle and are prepared to receive static friction for more driving power in a straight ahead direction.

*Example No. 4*

Another example of the three drive axle proportional drive system is if the center drive wheel means lost its traction. The rotation of the center drive wheel means would continue as if it had traction without adverse effects on the operation of the vehicle.

*Example No. 5*

Assume that both the left drive wheel means and the center drive wheel means lost their traction but that the right drive wheel means maintained its traction. By applying brake means 39 on left drive shaft 33, torque is applied to the right drive wheel means. As the left drive shaft 33 and the left proportional gear housing 69 slows to the speed of the positively rotating center drive external sprocket 121. The right proportional gear housing 95 and the right drive shaft 37 increases to the speed of the positively rotating center drive external sprocket 121, thereby transferring braking force in the form of driving torque to the right drive shaft 37 and the right drive wheel means. In this example, assume that the vehicle which is driven by a three-drive wheel, three-drive axle proportional differential assembly, is trying to move straight ahead, but is stalled because it has lost traction. In this situation, the right drive wheel means is the only wheel with traction but is rotating at zero r.p.m. because both the center drive wheel means and the lift drive wheel means are on ice and have lost their traction. The center drive wheel means is positively driven and will always rotate in the direction and at the speed intended, in this example plus three r.p.m. Because the center drive wheel means is on ice, it cannot help to pull the vehicle forward. The left drive wheel means is also on ice and is rotating at six r.p.m. but it cannot help to pull the vehicle forward because it is on ice. By applying the brake means 39 to the left drive wheel means, without traction, braking force will be transferred in the form of torque to the right drive wheel means with traction. As the left brake means 39 slows the left wheel means to plus five r.p.m., the right drive wheel means will have its rate of rotation increased from zero to plus one r.p.m. The center drive wheel means will still be positively rotating at three r.p.m. and the vehicle will start to move forward from zero to one r.p.m. As the left brake means on the left drive wheel means continues to transfer torque to the right drive wheel means, the left drive wheel means continues to slow down from five r.p.m. to four r.p.m. and the right drive wheel means continues to gain rotation from one r.p.m. to two r.p.m. and the vehicle speed increases proportionately. The center drive wheel means is still rotating at plus three r.p.m. Finally, as the left brake on the lift drive wheel means continues to transfer torque to the right drive wheel means, the left drive wheel means continues to slow down from four r.p.m. to three r.p.m. and the right drive wheel means continues to gain rotation from two r.p.m. to three r.p.m. while the center drive wheel means continues to rotate at three r.p.m. Thus all three-drive wheel means are travelling at three r.p.m. which is the speed of the vehicle.

The embodiment illustrated in FIG. 3 functions in the same manner as the embodiment of FIGS. 1 and 2 by following the same formula of proportioning positive rotation and direction to each of the three-drive axles and drive wheel means. The right and left brakes in FIG. 3 are used to transfer torque to the drive wheel with traction as in FIGS. 1 and 2 and the primary difference in the embodiment of FIG. 3 is the simplified gear train which transfer power to the center drive axle and wheel means.

In FIG. 3, torque from a power source is divided into three drive trains by the proportional differential means 125, the first being the center drive train from the differential gear 163 through the idler gear 165 to the power gear 175 and center drive shaft 173; the second being the left drive train through the spider gears 143 and left differential gear 153 to the left drive shaft 151; and the third being the right drive train through the spider gears 143 and right differential gear 159 to the right drive shaft 157. Because differential gear 163 is the same pitch diameter as power gear 175, the rotation and direction of center drive shaft 173 will be identical to differential gear 163 and ring gear 133.

From the power source, pinion gear 131 rotates the ring gear 133 and the proportional differential assembly which includes: (1) the differential case 135; (2) the differential gear 163 which drives the center drive shaft 173 at the same speed and direction as the differential gear 163; and (3) the spider shafts 141 and spider gears 143 which initiates the division of rotation of the left drive shaft 151 and the right drive shaft 157.

Because the center line of spider shafts 141 and spider gears 143 divides equally the horizontal distance between the left differential gear 153 and the right differential gear 159, the spider shafts 141 and spider gears 143 automatically divides the sum of the rotation of the left differential gear 153 or the left drive shaft 151 and the right differential gear 159 or right drive shaft 157, vertically about or around the center line of left drive shaft 151 and right drive shaft 157. Thus, one-half the summation of the rate of rotation of left differential gear 153 and right differential gear 159 equals the rate of rotation of ring gear 133, drive gear 163, differential case 135, and center drive shaft 173.

Thus the rate of rotation of the center drive shaft is equal to one-half the summation of the rate of rotation of the left drive shaft and right drive shaft. The following examples illustrate the operation of the proportional differential means 125 of FIG. 3.

*Example No. 6*

Assuming that the vehicle is making a right pivot turn and has a three-drive wheel, three-drive axle proportional differential assembly driven by a source of power, then; the power source rotates the pinion gear 131, the ring gear 133 and the differential case 135 with its respective differential components, clockwise at two r.p.m., in this example. The differential gear 163 transfers its rotation through idler gear 165 to the power gear 175, the center drive shaft 173 and the center drive wheel means. Because the differential gear 163 and the power gear 175 have identical pitch diameters in its description, rotation of the differential gear 163 and the center drive wheel means is positive and clockwise at two r.p.m. When making a right pivot turn, the operator of the vehicle activates the right brake means 161, holding the right drive shaft 157 and the right drive wheel means in a locked position. Thus, the right drive wheel means, the right drive shaft 157 and the right differential gear 159 are held at zero r.p.m. From previous explanation, it has been stated that the differential case 135 which rigidly holds spider shafts 141 in position, is rotating clockwise around the center line of the left and right drive shaft at two r.p.m. The spider gears 143 engage both left differential gear 153 and right differential gear 159, and spider gears 143 are free to rotate around the spider shafts 141. Thus, the force of the gear teeth of right differential gear 159 is at zero r.p.m. upon the gear teeth of the spider gears 143, which are free to rotate around the spider shafts 141, and are rotating at two r.p.m. around the center line of left drive shaft 151 and right drive shaft 157 which will result in the gear teeth of the spider gears 143 forcing the left differential gear 153 to rotate clockwise at four r.p.m. around the center line of left drive shaft 151 and right drive shaft 157. Because the left differential gear 153 is rigidly connected to the left drive shaft 151 and the left drive wheel means, the left drive wheel means will rotate clockwise at four r.p.m. as proven by the following formula.

$$LDS = 2\ CDS - RDS$$

$$LDS = 2 \times 2\ \text{r.p.m.} - \text{zero r.p.m.}$$

$$LDS = 2 \times 2\ \text{r.p.m.}$$

$$LDS = 4\ \text{r.p.m. clockwise}$$

or:

$$CDS = \frac{LDS + RDS}{2}$$

Obviously, the converse of the above would be true when making a left pivot turn and that the reversing the direction of power source would result in the same performance in a reverse direction.

*Example No. 7*

Assume that in a three-drive wheel, three-drive axle proportional differential assembly driven by one source of power, the vehicle makes a power right turn which has a turning radius of less than the tread width of the two outside drive wheels. As before, the power source rotates the pinion gear 131, the ring gear 133, the differential gear 163 and the differential case 135 with its respective differential components, clockwise at two r.p.m., in this example. The differential gear 163 transfers its rotation through the idler gear 165 to the power gear 175, the center drive shaft 173 and the center drive wheel means. Because the differential gear 163 and the power gear 175 are the same pitch diameters, rotation of the differential gear 163 and the center drive wheel is positive and clockwise at two r.p.m. Assuming further that all three drive wheel means have traction and the radious of the very tight right turn requires that the left drive wheel means rotates clockwise at six r.p.m. Because the left drive wheel means is operatively connected to the left drive shaft 151 and the left drive shaft 151 is operatively connected to the left differential gear 153, rotation of the left differential gear 153 is clockwise at six r.p.m. The differential case 135, which rigidly holds spider shafts 141 in position is rotating clockwise around the center line of the left and right drive shafts at two r.p.m. The spider gears 143 engage both the left and right differential gears and are free to rotate about spider shafts 141. Thus, the force of the gear teeth of left differential gear 153 is at six r.p.m. upon the gear teeth of the spider gears 143, which are free to rotate around spider shaft 141 and are rotating at two r.p.m. around the center line of left drive shaft 151 and right drive shaft 157, which will result in the gear teeth of the spider gears 143 forcing the right differential gear 159 to rotate counter-clockwise at minus two r.p.m. around the center line of left drive shaft 151 and right drive shaft 157.

Because the right differential gear 159 is operatively connected to the right drive shaft 157 and the right drive wheel means, the right drive wheel means will rotate counterclockwise at minus two r.p.m. The foregoing can be computed by the formula previously disclosed.

The converse of the above would be true when making a sharp left turn and a reversing of the direction of the power source would result in the same performance in the reverse direction. It is an important feature of this invention to be able to make sharp power turns, right or left, because the tread width of the three-drive wheel and drive axle proportional differential are likely to have wider tread widths. It should be pointed out that the center drive wheel means will always have positive rotation and that the rotation of either the left drive wheel or the right drive wheel will always be equal to or greater than, the rotation of the center drive wheel, and in the same direction.

The brake means 155 and 161 in proportional differential means 125 are utilized to transfer torque from various of the driving wheels as was described in the method of operation of the embodiment of FIGS. 1 and 2.

The proportional differential means described herein with three driving axles has many advantages over the standard differential with two drive axles. The first great advantage is that a greater number of driving wheels will automatically proportion torque and rotation to the radius of any turn. As stated before, the proportional differential means described herein is especially well adapted for use on a pneumatic tired roller. The pneumatic tired roller is a very heavy vehicle which exerts up to one hundred pounds ground pressure per square inch of tire contact area which equals a 3500 pound load per each 7:50×15 compactor tire. The forces on the tires other than the heavy load being carried causes tire failure. The most common pneumatic tired rollers today are a nine-wheeled type having five wheels in front and four wheels in the rear. The front tire tread width overlaps the rear tire width and two sets of dual wheels and tires propel the roller with a standard two-axle truck differential. Sprockets and roller chains, attached to the left drive axle of the truck differential, drive the left dual rear wheels and tires and the right drive axle of the standard differential drive the right dual rear wheels and tires. The present two-drive axle differential rubber tired roller, with or without a no-spin differential assembly, has only one drive axle and its corresponding dual wheels propelling the multiple wheel rubber tired roller when making a short right or left turn. Compare the standard roller with the three-drive axle proportional differential, with all the three-drive axles and six driving wheels proportioning torque automatically to the radius of the turn. The invention disclosed herein provides traction to propel the roller over uneven surfaces or making a sharp turn without presenting problems as is common with present models of pneumatic tired rollers.

Dual wheel drives, as used today, are within the tolerances of the tire manufacturers and the highway inspectors. Because standard tired rollers are limited to two-drive axles, the number of wheels per roller is limited. The shortcomings of the standard pneumatic tired roller have been common in the art with one manufacturer attempting to devise a roller with three driving wheels fixed to a common axle, instead of duals, for either side of a standard differential. The object of that device was to build a larger machine with wider compaction coverage and did work exceptionally well until the vehicle made a sharp right or left turn. The slippage of the three driving tires, fixed to a common axle, caused tire failure and scoring of the surface being rolled. This was caused because the rotation and distance travelled by each wheel was in proportion to the radius of a turn. The radius of the inside wheel was less than the center wheel and the center wheel was less than the outside wheel. Thus, a proportional differential means as described herein with three driving axles driving three sets of dual wheels and tires can be used because each set of dual wheels automatically proportions the driving power to the radius of the turn. The proportional differential means described herein also permits a roller to be constructed with a greater number of compacting wheels which creates a lower center of gravity for the vehicle. FIG. 4 illustrates a rear view of a 19 wheel pneumatic tired roller utilizing the proportional differential means of FIGS. 1 and 2 and FIG. 5 illustrates a 19 wheel pneumatic tire roller utilizing the proportional differential means of FIG. 3. The utilization of the proportional differential means on a pneumatic tired roller would result in a smoother and a more even plane in the compaction of the road bed because the compacting widths which form a plane, both front and rear, are wider than the standard pneumatic tired rollers presently available.

It can be seen that the proportional differential means of this invention is strongly built and easily serviceable due to the structure thereof. From the foregoing it can be seen that the device accomplishes at least all of its stated objectives.

Some changes may be made in the construction and arrangement of my proportional differential means without departing from the real spirit and purpose of my invention, and it is my intention to cover by my claims, any modified forms of structure or use of mechanical equivalents which may be reasonably included within their scope.

I claim:
1. In combination with a vehicle having a frame,
   a left and right primary drive wheel means on said frame,
   a third drive wheel means on said frame and being located in a vertical plane substantially equidistant from each of said primary drive wheel means,
   a power source adapted to provide rotational power,
   a differential means connected to said power source,
   gear means in said differential means, said gear means including separate gears independently connected to said primary drive wheels, and
   connecting power means operatively connected to said third drive wheel means and said gears whereby the speed of rotation of said third drive wheel means multiplied times its diameter will be one-half the summation of the respective rotational speeds of said primary drive wheel means multiplied by their respective diameters.

2. The combination of claim 1 wherein said connecting power means includes a proportional differential means, said proportional differential means consisting of a hollow, rotatable proportional differential case having right and left sides, a center drive external sprocket means operatively secured to said proportional differential case, a center idler shaft in said proportional differential case and extending outwardly from the right and left sides thereof, a proportional shaft housing rotatably mounted on said center idler shaft, a proportional spider shaft means secured to and extending between said proportional shaft housing and said proportional differential case, a proportional spider gear means rotatably mounted on said spider shaft means, left and right proportional drive gears in engagement with said proportional spider gear means, said proportional spider shaft means being located equidistant from said right and left proportional drive gears, left and right proportional drive shafts operatively connected to said left and right proportional drive gears, said differential means including left and right drive shafts rotatably extending therefrom, said left and right drive shafts being operatively connected to said left and right primary drive wheel means respectively and being operatively connected to said left and right proportional drive shafts respectively said center drive external sprocket means being operatively connected to said center drive wheel means.

3. The combination of claim 1 wherein said differential means includes a pinion gear operatively connected to said power source, a ring gear in operative engagement with said pinion gear, a differential case connected to said ring gear, a spider shaft means in said differential case and operatively connected thereto, a spider gear means rotatably mounted on said spider shaft means, right and left drive gears in operative engagement with said spider gear means, right and left drive shafts operatively connected to said right and left drive gears respectively and being operatively connected to said right and left primary drive wheel means, a drive gear connected to said differential case, an idler gear in operative engagement with said drive gear, a power gear in operative engagement with said idler gear, and a center drive shaft connected to said power gear, said center drive shaft being operatively connected to said center drive wheel means.

4. The combination of claim 3 wherein right and left brake means are in operative engagement with said right and left drive shaft respectively and are individually adapted to slow or stop the rotation of said right and left drive shafts respectively at times.

5. The combination of claim 2 wherein said left and right drive shafts have left and right transfer sprocket means secured thereto respectively, said left and right proportional drive shafts having left and right power sprocket means secured thereto, said left transfer sprocket means and said left power sprocket means being operatively connected, said right transfer sprocket means and said right power sprocket means being operatively connected.

6. The combination of claim 1 wherein said differential means includes left and right drive shafts operatively connected to said left and right primary drive wheel means, said connecting power means including left and right proportional drive shafts operatively connected to said left and right drive shaft and operatively engaging a rotatable proportional differential case, a center drive external sprocket means secured to said proportional differential case for rotation therewith, said center drive external sprocket means being operatively connected to said third drive wheel means.

7. The combination of claim 2 wherein said left and right proportional drive gears are operatively connected to left and right proportional gear housings respectively which are rotatably mounted in said proportional differential case, said left and right proportional gear housings being operatively connected to said left and right proportional drive shafts respectively.

8. The combination of claim 1 wherein said differential means includes right and left drive shafts operatively connected to said right and left primary drive wheel means and wherein right and left brake means are in operative engagement with said right and left drive shafts respectively and are individually adapted to slow or stop the rotation of said right and left drive shafts respectively at times whereby torque may be selectively transferred from one drive shaft to another.

9. The combination of claim 1 wherein said differential means includes a pinion gear operatively connected to said power source, a ring gear in operative engagement with said pinion gear, a differential case connected to said ring gear, a spider shaft means in said differential case and operatively connected thereto, a spider gear means rotatably mounted on said spider shaft means, right and left drive gears in operative engagement with said spider gear means, right and left drive shafts operatively connected to said right and left drive gears respectively and being operatively connected to said right and left primary drive wheel means, a drive gear connected to said differential case, an idler gear in operative engagement with said drive gear, a power gear in operative engagement with said idler gear, and a center drive shaft connected to said power gear, said center drive shaft being operatively connected to said center drive wheel means.

10. The combination of claim 1 wherein said differential means includes a pinion gear operatively connected to said power source, a ring gear in operative engagement with said pinion gear, a differential case connected to said ring gear, a spider shaft means in said differential case and operatively connected thereto, a spider gear means rotatably mounted on said spider shaft means, right and left drive gears in operative engagement with said spider gear means, right and left drive shafts operatively connected to said right and left drive gears respectively and being operatively connected to said right and left primary drive wheel means, a drive gear connected to said differential case, a power gear in operative engagement with said drive gear, and a center drive shaft connected to said power gear, said center drive shaft being operatively connected to said center drive wheel means.

11. The combination of claim 1 wherein said differential means includes a pinion gear operatively connected to said power source, a ring gear in operative engagement with said pinion gear, a differential case operatively connected to said ring gear for rotation therewith, a center idler shaft rotatably mounted in said differential case, a cross assembly freely rotatably mounted on said center idler shaft, a spider shaft means in said differential case and operatively connected to said cross assembly and said differential case, right and left drive gears in operative engagement with said spider gear means, right and left drive shafts operatively connected to said right and left drive gears respectively, said right and left drive shafts each having internally recessed inner ends which rotatably receive opposite ends of said center idler shaft, said right and left drive shafts being operatively connected to said left and right primary drive wheel means respectively, a drive gear operatively connected to said differential case for rotation therewith, a power gear in operative engagement with said drive gear, said third drive wheel means being operatively connected to said power gear.

12. The combination of claim 1 wherein said differential means includes a pinion gear operatively connected to said power source, a ring gear in operative engagement with said pinion gear, a differential case operatively connected to said ring gear for rotation therewith, a center idler shaft freely rotatably mounted in said differential case, a spider shaft means in said differential case and operatively connected to said center idler shaft and said differential case, right and left drive gears in operative engagement with said spider gear means, right and left drive shafts operatively connected to said right and left drive gears respectively, said right and left drive shafts each having internally recessed inner ends which rotatably receive opposite ends of said center idler shaft, said right and left drive shafts being operatively connected to said left and right primary drive wheel means respectively, a drive gear operatively connected to said differential case for rotation therewith, a power gear in operative engagement with said drive gear, said third drive wheel means being operatively connected to said power gear.

References Cited

UNITED STATES PATENTS

| | | | |
|---|---|---|---|
| 1,956,253 | 4/1934 | Schoenrock | 74—710.5 |
| 2,730,182 | 1/1956 | Sloane | 74—710.5 X |
| 2,837,733 | 6/1958 | Azgapetian | 74—710.5 X |
| 2,962,916 | 12/1960 | Koelsch | 74—710.5 |
| 3,008,350 | 11/1961 | Misener | 74—710.5 |

FOREIGN PATENTS 681,325 10/1952 Great Britain.

DONLEY J. STOCKING, *Primary Examiner.*

ARTHUR T. McKEON, *Assistant Examiner.*